US008655710B2

(12) United States Patent  (10) Patent No.: US 8,655,710 B2
Clarkson  (45) Date of Patent: Feb. 18, 2014

(54) TECHNOLOGY BENEFITS REALIZATION FOR PUBLIC SECTOR

(75) Inventor: Peter H. Clarkson, Fairfax, VA (US)

(73) Assignee: Accenture Global Services GmbH (CH)

( * ) Notice: Subject to any disclaimer, the term of this patent is extended or adjusted under 35 U.S.C. 154(b) by 1216 days.

(21) Appl. No.: 12/314,683

(22) Filed: Dec. 15, 2008

(65) Prior Publication Data

US 2009/0138308 A1    May 28, 2009

Related U.S. Application Data

(62) Division of application No. 10/679,510, filed on Oct. 7, 2003, now abandoned.

(51) Int. Cl.
*G06Q 10/00* (2012.01)
*G06Q 10/06* (2012.01)

(52) U.S. Cl.
CPC .................................. *G06Q 10/0637* (2013.01)
USPC ........ 705/7.36; 705/7.37; 705/7.38; 705/7.39

(58) Field of Classification Search
None
See application file for complete search history.

(56) References Cited

U.S. PATENT DOCUMENTS

| | | | |
|---|---|---|---|
| 5,799,286 A * | 8/1998 | Morgan et al. ................... 705/30 |
| 6,219,654 B1 * | 4/2001 | Ruffin ............................ 705/400 |
| 6,249,769 B1 * | 6/2001 | Ruffin et al. .................. 705/7.13 |
| 6,260,020 B1 * | 7/2001 | Ruffin et al. .................. 705/7.25 |
| 6,275,812 B1 * | 8/2001 | Haq et al. ...................... 705/7.14 |
| 6,442,557 B1 | 8/2002 | Buteau et al. |
| 6,526,387 B1 * | 2/2003 | Ruffin et al. .................. 705/7.29 |
| 6,557,008 B1 * | 4/2003 | Temple et al. ......................... 1/1 |
| 6,671,673 B1 * | 12/2003 | Baseman et al. ............. 705/7.26 |
| 6,675,149 B1 * | 1/2004 | Ruffin et al. .................. 705/7.12 |
| 6,738,736 B1 | 5/2004 | Bond |
| 6,871,182 B1 * | 3/2005 | Winnard et al. .............. 705/7.37 |
| 6,968,324 B1 * | 11/2005 | Ruffin et al. ................... 705/400 |
| 7,162,427 B1 * | 1/2007 | Myrick et al. ................. 705/348 |
| 7,487,079 B2 * | 2/2009 | Benny et al. ..................... 703/22 |
| 7,640,196 B2 * | 12/2009 | Weiss ............................... 705/35 |
| 8,095,415 B1 * | 1/2012 | Thomas et al. ............... 705/7.39 |
| 2001/0053993 A1 * | 12/2001 | McLean et al. .................. 705/10 |
| 2002/0042751 A1 * | 4/2002 | Sarno ............................... 705/26 |
| 2003/0093310 A1 | 5/2003 | Macrae |
| 2003/0158800 A1 * | 8/2003 | Pisello et al. .................... 705/35 |
| 2003/0172145 A1 * | 9/2003 | Nguyen ......................... 709/223 |

(Continued)

OTHER PUBLICATIONS

Feldstein, Martin S.; "Cost-Benefit Analysis and Investment in the Public Sector". Dec. 1964. Public Administration. vol. 42, Issue 4. pp. 351-372.*

Barua, Anitest; Konana, Prabhudev; Whinston, Andrew B.; Yin, Fang;. "Driving E-Business Excellence". Fall 2001. MIT Sloan Management Review. vol. 43, Non. 1.*

(Continued)

*Primary Examiner* — Brett Feeney
(74) *Attorney, Agent, or Firm* — Finnegan, Henderson, Farabow, Garrett & Dunner, LLP

(57) ABSTRACT

The present invention provides a public sector technology expenditure benefits realization framework that offers an unparalleled approach for addressing the very specific needs of public sector organizations combining the development of the business case with technology implementation program and integrating a sustainable long-term benefits realizations program. Specifically, in one embodiment, the methodology of the present invention integrates three steps: (1) the visioning phase for creating the vision for the planned benefits; (2) the integration phase comprising the integrating the planned benefits from the technology expenditure; and (3) the realization phase during which the public entity incorporates a sustainable benefits realization and monitoring program.

17 Claims, 16 Drawing Sheets

(56) References Cited

U.S. PATENT DOCUMENTS

| | | | |
|---|---|---|---|
| 2003/0172247 A1* | 9/2003 | Bayer et al. | 712/12 |
| 2004/0024674 A1* | 2/2004 | Feldman | 705/36 |
| 2004/0039676 A1* | 2/2004 | Trainer | 705/36 |
| 2004/0059615 A1* | 3/2004 | Byrer et al. | 705/8 |
| 2004/0098300 A1* | 5/2004 | Karwatowski et al. | 705/11 |
| 2004/0128174 A1* | 7/2004 | Feldman | 705/7 |
| 2004/0133439 A1* | 7/2004 | Noetzold et al. | 705/1 |
| 2005/0065841 A1* | 3/2005 | Middleton | 705/11 |
| 2005/0075915 A1* | 4/2005 | Clarkson | 705/7 |
| 2005/0080696 A1* | 4/2005 | Bagchi et al. | 705/35 |
| 2005/0131754 A1* | 6/2005 | Chapman et al. | 705/10 |
| 2005/0171877 A1* | 8/2005 | Weiss | 705/35 |
| 2005/0198486 A1* | 9/2005 | Desmond et al. | 713/1 |
| 2006/0089943 A1* | 4/2006 | Creel et al. | 707/102 |
| 2006/0136312 A1* | 6/2006 | Raguseo et al. | 705/35 |
| 2008/0133259 A1* | 6/2008 | O'Connor et al. | 705/1 |
| 2009/0216589 A1* | 8/2009 | Ricci | 705/7 |

OTHER PUBLICATIONS

"Benefit-Cost Analysis Guide". Jul. 1998. Treasury Board of Canada Secretariat.*

"Strategy for the Implementation of eProcurement in the Irish Public Sector". Oct. 2001.*

Kahraman, Cengiz. "Fuzzy Versus Probabilistic Benefit/Cost Ratio Analysis for Public Work Projects". 2001. International Journal of Applied MAth and Computer Science. vol. 11, No. 3.*

Kinnunen, Olli. "Management of Project Risks in Logistics Development". May 16, 2000. Helsinki University of Technology—Department of Engineering Physics and Mathematics.*

MacManus, Susan A.; "Understanding the Incremental Nature of E-Procurement Implementation at the State and Local Levels". 2002. Journal of Public Procurement. vol. 2, Issue 1.*

Shank, John K.; Govindarajan, Vijay; "Strategic Cost Analysis of Technological Investments". Fall 1992. Sloan Management Rview. vol. 34, No. 1.*

* cited by examiner

| ◁ ▷ ▷▷| | 7 | Total: | 54 | | Unsorted |

Financial/Planning & Budgeting
Process Group

— 4 Processes

| Topic | In Scope? | Status | % Complete |
|---|---|---|---|
| ⇨ Budget Development | Yes | Open | 0% |
| ⇨ Budget Distribution | Yes | Open | 0% |
| ⇨ Planning | Yes | Open | 0% |
| ⇨ Variance Control | Yes | Open | 0% |

Fig. 6C

| ◁ ▷ ▷▷| | 4 | Total: | 10 | | Unsorted |

Financial/Planning & Budgeting/Budget Development
Process

— 5 Activities

| Topic | In Scope? | Status | % Compl |
|---|---|---|---|
| ⇨ Approval | Yes | Open | 0% |
| ⇨ Budget Guidelines | Yes | Open | 0% |
| ⇨ Budget Preparation | Yes | Open | 25.0% |
| ⇨ Use Historical Data | Yes | Open | 0% |
| ⇨ Use Simulations | Yes | Open | 0% |

Fig. 6D

TECHNOLOGY BENEFITS REALIZATION FOR PUBLIC SECTOR

CROSS-REFERENCE TO RELATED APPLICATION

This is a divisional of application Ser. No. 10/679,510, filed Oct. 7, 2003, now abandoned which is incorporated in its entirety herein by reference.

SPONSORED RESEARCH OR DEVELOPMENT

Not Applicable

SEQUENCE LISTING

Not Applicable

BACKGROUND OF THE INVENTION

1. Field of the Invention

The present invention relates to a system and method for identifying and quantifying the benefits to a public sector entity from technology acquisitions. Furthermore, the present invention provides a methodology for guiding a public sector entity to realize the identified benefits from the technology acquisitions.

2. Description of Related Art

Public sector organizations operate with different priorities and pressures than those in the private sector. Specifically, the public sector organizations are generally charged with a specific mandate and utilize technology to help their organizations operate within these frameworks. Typically, public sector organizations usually cannot shift into new areas. A public sector organization's mandate is politically directed and prioritized with new initiatives and directions coming from changes in government policy, approach and priorities. While maintaining confidential or restricted-access information, the public sector organizations are constantly challenged to be accessible, to be open, and to provide access to its information to the public. With human resource and personnel costs often being the primary cost driver in the organization, a primary concern of the public sector organizations is to deploy and manage resources economically and efficiently as needed to achieve the mandates.

In addressing these pressures and priorities, public sector organizations tend to focus on meeting their prescribed mandate; controlling resources to stay within their budget authority; optimizing the utilization of their resources—people, facilities, and information; and providing information to other government agencies and to the public on their programs and accomplishments.

Thus, in managing their diverse organizations, public sector entities face the constant pressure to reduce cost while delivering higher value to the public. The public sector organizations are pressured to reduce operational costs and complexities in order to permit a higher percentage of resources to be dedicated for delivering the front line work—meeting their mandate. Compounding the complexity is a need to accommodate changes in programs, priorities, and oftentimes, reorganization and consolidations with other public sector entities. Overall, these pressures require programs, systems and controls that ensure that the mandate is being carried out and reported on with due regard for economy, efficiency and effectiveness.

Several methods have been used to measure the benefits of technology expenditures to a public sector entity. In one method, an auditing approach has been used to document the potential savings in these types of organizations. This approach usually involves a "picture in time" type of measurement study where functions are looked at in detail with the potential savings estimated. The studies tend to be organizationally focused meticulously detailing the potential savings throughout an organization and its agencies. These studies tend to have relatively high costs because of the time and expense needed to document the operating areas and to create well-suited cost measures that can be used as the basis for formulating the savings for the particular entity. Once the snapshot has been taken, the study tends to become a reference document. While taking an audit or a snapshot-in-time can help to estimate the scope of possible savings with a technology acquisition, the organization is left with little direction on implementing the technology expenditure as needed to achieve the desired goals. Unless there is a follow up program that helps transition and manage the change to realize the benefits, such studies simply become volumes that document a theoretical potential. Unless the work is built on a framework that will allow the organization to implement and manage the change, little lasting value will have been done.

Another approach that has been used to measure the benefits of technology expenditures is to employ industry-based business practices as the framework for estimating the value of change. For instance, businesses commonly use return-on-investment (ROI) tools that attempt to estimate the benefits of technology expenditure as realized through resulting decreases in costs (e.g., through lower personal costs) or increased revenues (e.g., through increased sales) In the context of the public sector organizations, this approach attempts to quantify the benefits of technology expenditure by applying industry-based business processes to public sector organizations. This approach tends to focus more on the operational business processes, but building such a framework raises numerous issues for public sector organizations. The first issue that immediately gives concern is that the business processes in public sector tend to be very different as to how they are used industry. While the two methods perform similar tasks, the two go about executing those tasks very differently. Consequentially, an industry-based business process view often does not work because the business processes and rationale across public sector organizations vary widely.

The second issue implicit in this approach is that not only are industry business processes used, but also the measurement metrics are based on industry standards. It is relatively easy in private industry to develop a set of metrics that can be used to measure the potential payoff from a technology acquisition. For example, a business can focus on inventory costs, examine potential reductions in inventory investment by, and value these savings at their cost of capital, thereby creating a measure and a target for the savings that the organization can attribute to the technology acquisition. In doing so, the target can be based on a range of metrics already available within their industry from similar firms doing similar activities. Thus the organization can easily look to existing metrics and targets on which to base a change strategy and programs. This application of this approach applies to public sector organizations is of concern since there are few generally accepted metrics for business processes within the public sector. Even if solid, comparable metrics could be devised, application of the metrics to deliver savings complicates the problem. Specifically, very few public sector organizations use the same business functions and metrics. For instance, the cost of capital may not be a useful metric to public organizations since the capital supplied to the organizations tends to be operational, budgetary funding that is fiscal year based. Likewise, reducing inventory investment by some factor may not have as much value in the public sector. Accordingly, there is a current need for approaches tailored and refined for public sector needs.

The case for measuring the benefits of technology expenditures can be made in the public sector, but it needs to take a different approach to building the case from that used in industry. As suggested above, it is rarely possible to use industry metrics and port them over. The industry metrics generally do not work since the tasks for the public sector organization generally do not have parallels in industry. Nor do they have consistent measurement bases—metrics across the public sector are often inconsistent as there are generally few comparable organizations on which a metric can be based. Finally, the majority of the cost structure in public sector organizations tends to be human resource and other people-related costs based since the cost of service delivery tends to dominate the cost structure. The efficiency gains in public sector from technology expenditures therefore tend to come from enhanced utilization and productivity gains that augment the delivery of increased and improved services to the public. For instance, public sector organizations may move more of the back office support chores to front line tasks, thus freeing up resources to deliver better services within tight budgets. For example, enhanced service delivery from technology efficiency gains may permit a policing organization to transfer costs associated with administration to those associated with police service delivery; i.e., reduce the level of administration costs to free up resources to support more police, more cruisers, better response equipment, etc.

As described above, the potential benefits from technology expenditure by a public sector entity cannot be easily measured using a finite single point in time snapshot study approach. Furthermore, these potential benefits do not appear overnight, but instead, tend to take time to effect. Generally, instantaneous overnight disruption in the public sector is not acceptable—migrating to lasting change is the goal. Thus, the focus for change in public sector can only come about if the technology expenditure builds in both a vision or plan that assesses the opportunity for benefits realization (i.e.: the business case), integrates it with a technology implementation program, and delivers a program to realize the benefits to effect lasting change. Otherwise a stand-alone business case becomes an exercise to secure funding rather than one of delivering lasting value. For these reasons, developing the business case for technology expenditures in the public sector must transition to a benefits realization program that includes: (1) Documenting the expected technology expenditure benefits for the enterprise; (2) Integrating benefits realization with the technology expenditure program; and (3) Building a sustainable benefits realization and monitoring program.

For optimal effect, the approach should be built at the outset at the beginning of the technology expenditure program. For instance, if the technology expenditure includes the acquisition and selection of new software, the other technology expenditure should be integrated to the specifics of that software. The program should be sustained with enhancements and developments through the implementation of the other technology acquisitions. Once the system has gone live, the benefits realization program needs to have sufficient depth of tools and process so that the expected change program can be monitored, and real values and benefits delivered. The work should not stay as a theoretical framework—real lasting value needs to be the result. Business case development in the public sector needs to build a program of sustainable continuous improvement so that the benefits can be realized.

In summary, the development of an technology expenditure business case for a public sector organization requires a methodology that: (1) Is tailored to the needs of public sector organizations; (2) Addresses public sector business functions from their operational and organization perspective; (3) Develops metrics that meet the needs for that specific organization; (4) Starts the program at the beginning of the technology expenditure; (5) Integrates the business case with the specific technology acquisitions to be implemented; (6) Optimizes the measurement and business process delivery throughout the implementation of technology acquisition; (7) Implements a concrete benefits delivery program; and (8) Implements tools and processes that can be used to implement, monitor and measure the effect of change.

BRIEF SUMMARY OF THE INVENTION

In response to these and other needs, the present invention provides a robust, fully integrated approach and a related system for public sector technology expenditure realization. In particular, the present invention offers a low risk, step-by-step approach to developing a complete benefits realization program in a public sector enterprise.

The present invention provides a public sector technology expenditure benefits realization framework that offers an unparalleled approach for addressing the very specific needs of public sector organizations by combining the development of the business case with technology implementation program and by further integrating a sustainable long-term benefits realizations program. Specifically, in one embodiment, the methodology of the present invention integrates three steps: (1) A visioning phase for creating the vision for the planned benefits; (2) An integration phase comprising the integrating the planned benefits from the technology expenditure; and (3) a realization phase during which the public entity incorporates a sustainable benefits realization and monitoring program. The three phases are preferably integrated such that the results from the visioning phase provide input to the integration phase that, in turn, develops the plans for the realization phase.

The objective of the visioning phase is to develop a framework on which a benefits realization program can be implemented and to evaluate the opportunity for savings expected from the technology acquisition. During the visioning phase, a public sector entity examines its key operational processes, relates these to the potential benefits and then evaluates the potential savings to complete the business case. The visioning phase includes the tasks of detailed functional mapping, the development of value drivers, and the evaluation of benefits potential.

In the detailed functional mapping, the organization uses a public sector specific framework to map the major functions (also referred to as business activities) carried out by the organization. The organization then decomposes these functions into major process groups. In turn, the organization decomposes the process groups into their major processes and further decomposes the major processes into various activities.

When developing value drivers, the organization develops sources of potential benefits, i.e., the value drivers, for each activity. The organization then relates the value drivers to benefits achievable if the value driver is met to determine transformation benefits. Subsequently, the organization relates the transformation benefits to benefits that could be delivered by the technology expenditures.

The organization may then evaluate potential benefits. For each of the technology expenditure benefits, the organization may benchmark the total cost for the technology expenditure. For each benchmark, the organization assesses a target achievement level for the benefit expected through the technology expenditure. The organization can next assess a probability range of actually achieving the target achievement level, and then calculates the expected potential of the technology expenditure benefit for the technology expenditure. The process results in a detailed business case for the technology expenditure that as applied to the public sector framework map.

As described above, a next main step after the visioning phase may be is the integration phase. The objective of the integration phase is to integrate and formalize the benefits realization program with the technology acquisition and to develop plans for realizing the benefits from the technology acquisition. To do this, the organization develops and implements a concrete program of tools, templates and monitoring processes to ensure that the benefits transformation program can be undertaken. This integration phase is started after the technology acquisition has been selected to allow a full integration of the visioning phase work to the technology acquisition. In an embodiment of the present invention, the integration phase includes two major components, the integration of a benefits framework and the development of benefit delivery plans.

During the integration of a benefits framework, the organization integrates the benefits delivery framework to the selected technology acquisition and integrates the benefits delivery framework to the planned scope and design of the technology acquisition. The development of benefit delivery plans generally includes the transfer of each expected benefit target activity to individual Benefits Delivery Plans (BDP). Next, the organization completes each of the BDPs with an appropriate benefits delivery manager. The organization then integrates all the BDPs to form a Organizational Benefits realization Program (OBRP).

In the next step, the realization phase comprises a third set of tasks in the methodology of the present invention. The objective of the realization phase is to integrate and formalize the benefits realization program in the organization. To accomplish these objectives, the organization works to develop and implement a concrete program of tools, templates and monitoring processes to ensure that the previously developed BDPs are implemented across the enterprise and then continuously monitored. This phase is best started after selection of the technology acquisition to allow a fine-tuning of the visioning phase work to the chosen technology. The realization phase similarly includes two tasks, the implementation of the BDPs and the use of a benefits realization monitor.

During the implementation of the benefit delivery plans, the organization formalizes the commitment for each BDP. The organization then takes steps to ensure that each manager implements their specific assigned BDP and understands the requirements for that BDP. Furthermore, the organization acts to ensure that desired progress is achieved and monitored. The organization may also consolidate all the BDPs across the enterprise, as necessary.

To use the benefits realization monitor, the organization first implements the benefits realization monitor to track and assess performance of the OBRP. Subsequently, the organization documents metrics and, then, adjusts and tunes the business plan changes.

In another embodiment, the present invention provides a related system for implementing the above-described technology benefits realization program.

DETAILED SUMMARY OF THE INVENTION

A more complete understanding of the present invention and advantages thereof may be acquired by referring to the following description taken in conjunction with the accompanying drawings, in which like reference numbers indicate like features, and wherein:

FIG. 6A-6J depicts exemplary screen shots from the system of FIG. 5 in accordance with embodiments of the present invention.

DETAILED SUMMARY OF THE INVENTION

Figure 1:
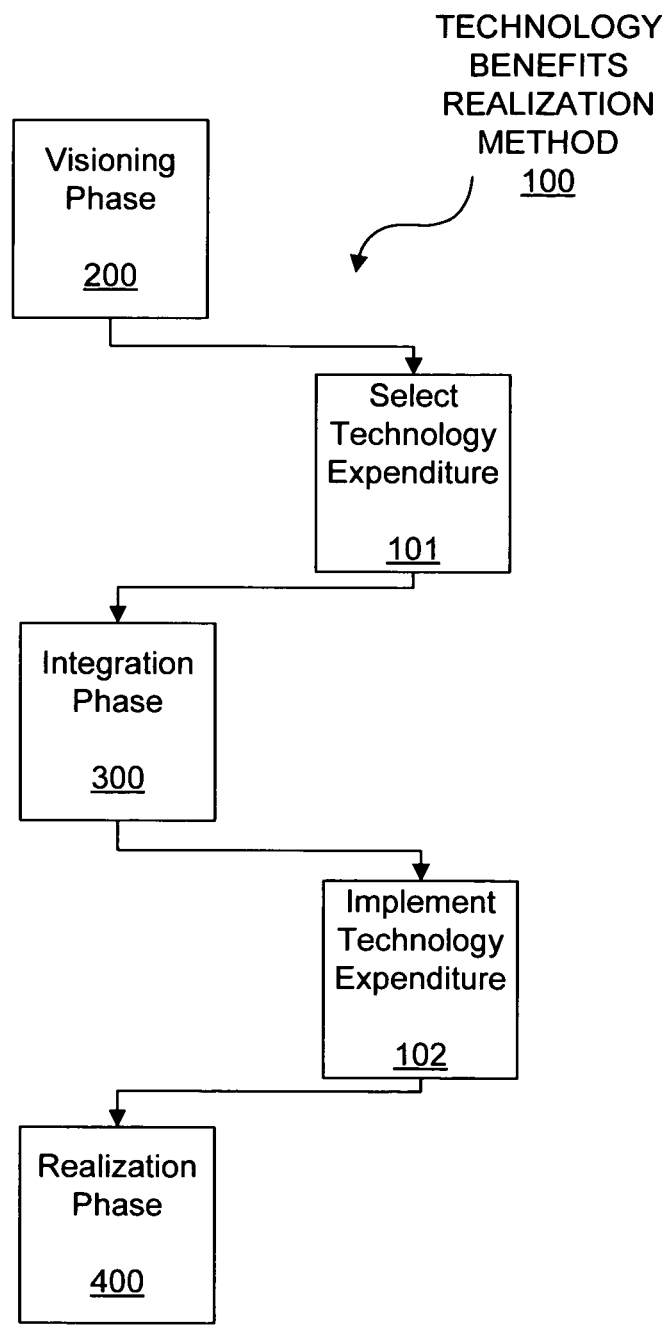
FIGS. 1-4B depict steps in a method for measuring and realizing benefits to a public sector organization from technology expenditure in accordance with embodiments of the present invention.

As depicted in FIG. 1, the present invention provides a public sector technology expenditure benefits realization method 100 that offers an unparalleled approach for addressing the very specific needs of public sector organizations combining the development of the business case with technology implementation program and integrating a sustainable long-term benefits realizations program. Specifically, the methodology 100 of the present invention integrates three steps: A visioning phase 200 for creating the vision for the planned benefits; an integration phase 300 comprising the integrating the planned benefits from the technology expenditure; and a realization phase 400 during which the public entity incorporates a sustainable benefits realization and monitoring program. The three phases (200, 300, and 400) are integrated such that results from the visioning phase provide input to the integration phase, which subsequently develops the plans for the realization phase.

The objective of the visioning phase 200 is to evaluate the opportunity for savings expected from the technology expenditure and to develop the framework on which a benefits realization program can be implemented. In particular, the visioning phase 200 develops a business case. This business case then provides the basis for implementing the benefits realization and performance-monitoring program. Thus, the business case is developed, and then, programs are implemented to ensure that the benefits are actually delivered to the organization. In this way the public sector organization's business processes are aligned to meet the goals established for the technology expenditure.

Figure 2A:
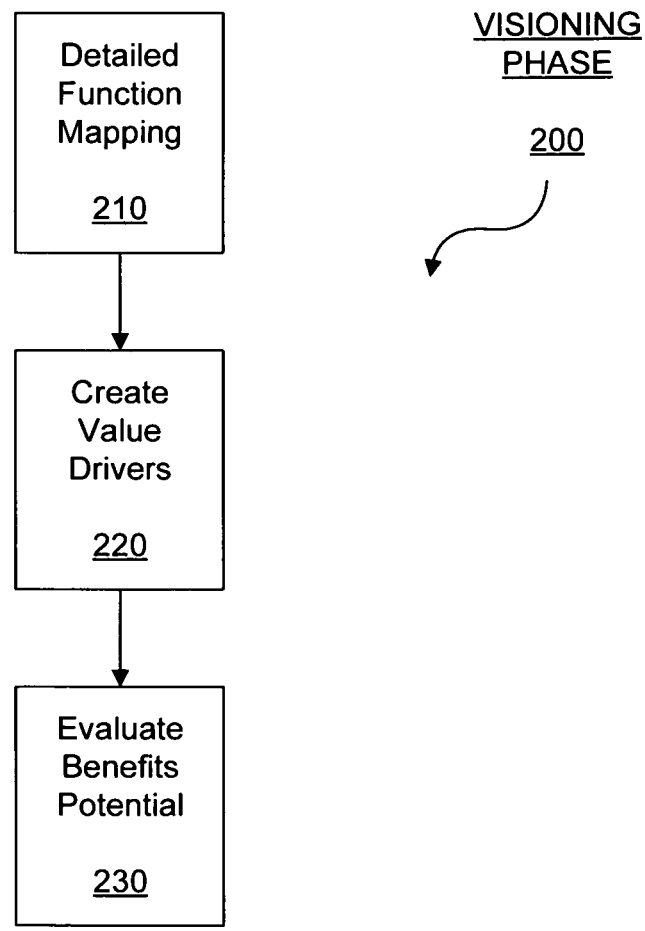

The visioning phase 200 examines the key business functions and processes, relates these functions and processes to the sources of benefits potentially delivered by a technology expenditure, and then evaluates the opportunity for savings within the organization. As depicted in FIG. 2A, there are three major tasks in the visioning phase 200, each of which generally builds on the work in the preceding step. It should be appreciated however that, by using a step-wise approach, the method 100 has the ability for the organization to update and refine the work at any point in time, even after the technology expenditure has been implemented. The tasks for the visioning phase 200 are detailed functional mapping (step 210), create value drivers (step 220), and evaluate benefits potential (step 230).

Figure 2B:
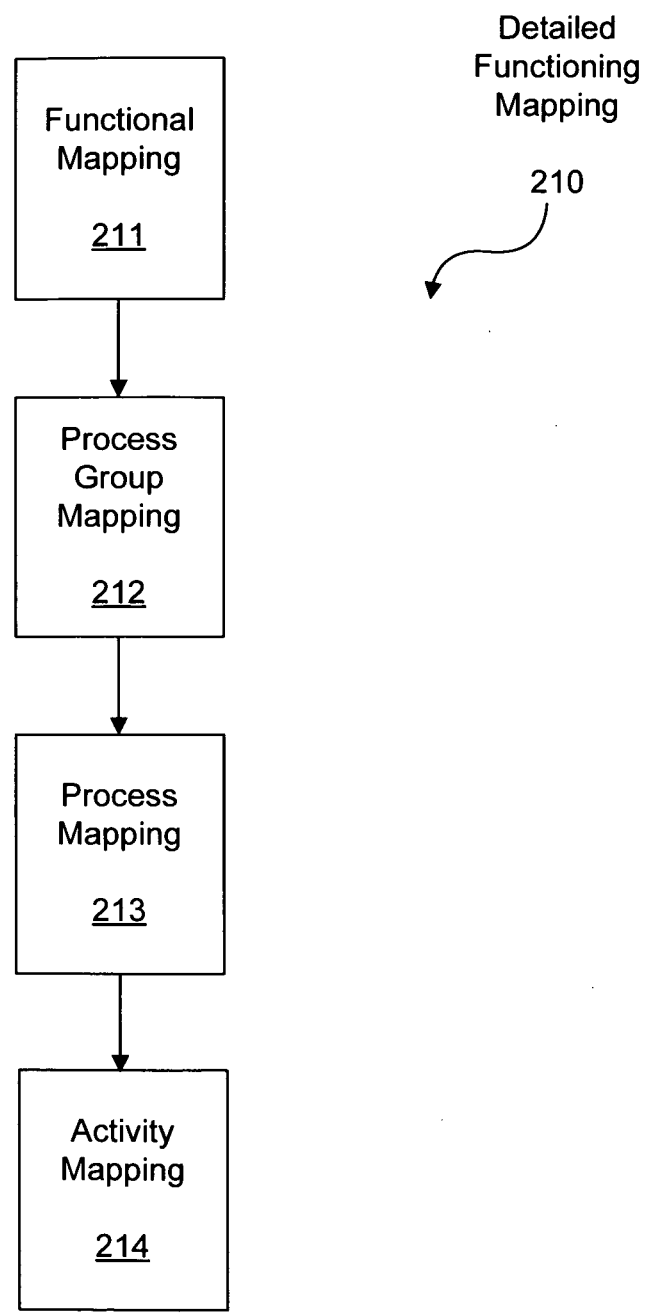
Figure 2C:
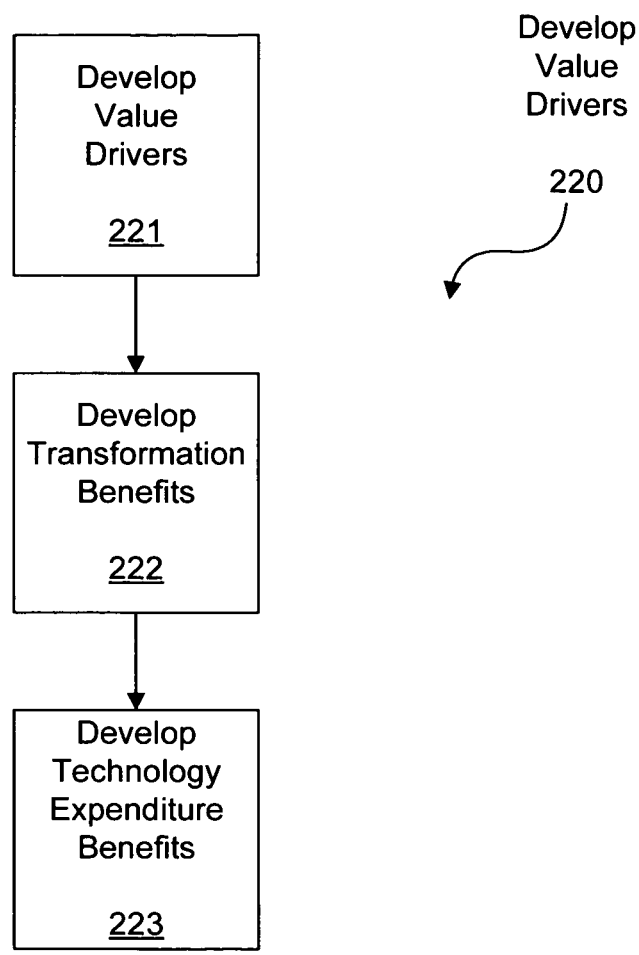

During detailed functional mapping in step 210, the organization develops an inventory of its business functions and its major business processes. The goal is to detail the business processes and tasks being carried out in the organization and to develop parameters for potential savings in these tasks. The strategic management of a public sector organization generally focuses on program delivery and resource management activities. From a management perspective, the organizations carry out a number of business functions across their organization. Within each function, there are a number of major processes that are managed. Improvements in these functional processes and related operations can deliver savings to the organization. It is the opportunity for improvements in the functional processes, that need to be addressed as part of the business case assessment for technology expenditures. Accordingly, as depicted in FIG. 2B, the detailed functional mapping in step 210 may be performed in four tasks: functional mapping in step 211, process group mapping in step 212, process mapping in step 213, and activity mapping in step 214. In step 211, functional mapping, the organization maps its major functions and business activities. Then, in the process group mapping of step 212, the organization decomposes the functions into process groups. During the process mapping of step 213, the organization further decomposes the process groups into the major processes. Subsequently, in the activity mapping of step 214, the organization decomposes the major processes into the constituent activities.

In one embodiment of the present invention, the functional mapping in step 211 uses the following twelve strategic functions listed and defined in TABLE 1 and, then, maps these twelve functions to the complete public sector organization, adjusting them as required. Larger organizations tend to perform all twelve functions, while smaller, mission-specific organizations may not.

TABLE 1

| Function | Summary | Processes Groups |
| --- | --- | --- |
| Strategic Management | strategic planning and program formulation | Organizational Strategy Program Formulation & Planning Program Management Corporate Intelligence |
| Financial Management | management of budgeting, financial and costing processes | Planning & Budgeting Financial Accounting Cost Accounting Cash Management Travel Management Project Accounting Grants Management |
| Revenue Management | revenues from taxes, permits, fees and other sources | Taxpayer Records Management Forms Management Tax Assessment Tax Billing Non-tax Revenue Revenue Accounting Payments & Collections Compliance |
| Human Resource Management | human resources and positions management | Organization Management Position Management Recruitment Personnel Admin Time & Attendance Compensation & Benefits Admin Payroll Personnel Development Training |
| Resource Management | resources deployment and utilization | Program Management Program Evaluation Resource Utilization Performance Measurement |

TABLE 1-continued

| Function | Summary | Processes Groups |
| --- | --- | --- |
| Procurement & Supply Chain Management | controlling procurement and related inventory | Procurement Control Tender Management Contract Management Inventory Control |
| Facilities & Asset Management | managing facilities, assets, property and leases | Asset Management Facilities & Equipment Fleet Management Real Estate Asset Disposal |
| Corporate Data Management | managing, securing and exploiting critical data | Records Management Workflow Data warehouse/ Knowledge library |
| Customer Relationship Management | managing and maintaining relationships with customers | |
| Program and Case Management | Managing various programs and cases being analyzed through the ERP | |
| Systems Management | information technology (IT) strategy, infrastructure, resources and systems | IT Strategy & Planning IT Resourcing Operations Access & Security |
| e-Government Management | enabling the world of e-Government | e-Access e-Support e-Revenue e-Procurement e-Employee e-Work |

As summarized in Table 1, there are a number of processes groups within each function that are managed and focus the operations of the public sector entity. These known processes represent the major business activities carried out by the organization. As such, the processes groups and the processes in these groups represent the operational business functions of the enterprise. Thus, these functions generally represent the areas that may be impacted through the implementation of a technology acquisition, and these areas are the source of the potential payback. Again, a public sector organization may not perform all the processes, but these processes apply to most public sector organizations. These functions are described in greater detail below.

Thus, once the functions are mapped, the organization then further decomposes the functions into process groups in step 212. The process groups represent the major business processes that are carried out within the strategic function. For example, as indicated in Table 1, an organization may decompose the Financial Management function into various process groups such as Budgeting, Financial Accounting, Cost Accounting, etc. The purpose of the process group mapping in step 212 is to gather and document all the major processes carried out in the organization and relate these to the functional areas. Obviously, the process groups listed in Table 1 may be expanded or adjusted as necessary. The organization may also relate the processes groups to various operational and organizational areas. As a result, if specific organizations and entities only carry out certain processes, these are documented as part of this work. These process groups are described in greater detail below.

Once an organization has the processes groups documented, then the organization may work on the next level of detail. The organization may then decompose the process groups into the processes carried out within each of the process groups, step 213. Again, the organization may expedite the work by using the unique, predefined set of processes, as specified below, and adjusting them as necessary. The various processes associated with each process group (and each function) are now described.

As provided above in TABLE 1, strategic management generally includes process groups related to the strategic planning and management for the organization and generally includes the processes of organizational strategy; program formulation & planning; program management; and corporate intelligence. The process group of organizational strategy relates to the alignment of the organization to its mandate and includes the processes of defining the organization role, government relationship management, community relationship management, and strategic planning. Another process group of program formulation and planning deals with planning and funding of major programs and includes processes, such as program design, formulation, and goals; planning and simulation/modeling; and the program submission/approval. Similarly, the program management process group relates to ensuring that the public sector organization's mandate is being met and includes the processes of program tracking and reporting; and audit and compliance. Continuing with the process groups in strategic management, the corporate intelligence process group relates to ensuring that corporate data is maintained, controlled, and secured. The corporate intelligence process group then includes the processes of data management, data access, and performance measurement.

Returning to the Table 1, the function of financial management generally includes those activities involved in budgeting and related financial management and control of the organization. The process group of planning and budgeting includes processes (such as planning, budget development, budget distribution, budget control, and variance analysis) that deal with developing and implementing budget controls. Another process group in financial management is financial accounting, which relates to maintaining the general ledger and accounting transactions. Processes in financial accounting include general ledger and sub-ledger management, find accounting, receivables management, and payables management. The process group of cost accounting deals with the costing of programs, projects and activities, such as the processes of cost accounting, cost recovery accounting, shared program delivery, activity costing, and cost allocations. The cash management process group deals with cash flow and cash management and includes the processes of funds management; cash control & cashiering; foreign exchange management; liquidity management; investment & debt management; and credit risk management. Continuing with the process groups in financial management, travel management deals with employee travel and related expenses, such as the processes of business trip administration; travel planning, bookings; travel approval and workflow; funds commitment; and travel expenses. Similarly, the process group of project accounting deals with project and related cost accounting, including the processes of project planning & budgeting; project control, variance analysis; project accounting; and project billing & cost recovery. Likewise, the process group of grants management deals with managing and administering grants programs, and includes processes related to grants & subsidies requests; approval and budgeting; and accounting.

Continuing with Table 1, the revenue management function relates to efforts by many public sector organizations take in some form of revenue. These public sector revenues may include revenue from income taxes, sales taxes, fees, licenses, permits, penalties, joint funding programs, grants, and other non-tax revenue such as leases, property disposals, etc. The functional processes associates with revenue management help a public sector organization lower program costs and to improve revenue collections.

Revenue management potentially includes numerous process groups. One of the process groups associated with revenue management, taxpayer records management, relates to managing tax payer records and generally includes the processes of taxpayer records management, debtor records management, and licensing record management. Similarly, the forms management process group deals with the distribution of tax forms, permits, licenses, etc and includes the processes of forms inventory and forms distribution. Another revenue management process group, tax assessment, relates to calculating and assessing taxes and includes the processes of tax calculation, tax assessment, and returns processing. Likewise, the process group of tax billing deals with billing taxpayers. Another process group relates to non-tax revenue (NTR) and includes processes concerning permits & fees; other goods & services; and other NTR revenues. Another process group, revenue accounting, deals with the accounting for various types of revenues such as to tax revenue distribution and non-tax revenue distribution processes. Continuing with revenue management, the process group of payments and collections deal with collecting taxes and non-tax revenue and includes the processes of receivables management, dunning & penalties, and collections & write offs. In the same way, the compliance process group includes processes such as of case management, dispute resolution, compliance enforcement, and refunds/credits that deal with revenue related compliance.

Usually, the largest and most complex structure within a public sector organization relates to Human Resources (HR). Typically, public sector human resources management is complex and requires intensive resources to handle. Thus, there can be significant opportunities to effect savings in the HR management functions. Continuing with Table 1, another set of functional processes relate to human resources management. One of the process groups, organization management, relates to the personnel organization structures and includes and includes the processes of organization structures and reorganization planning. Another process group, position management, deals with position administration and may includes several such as position administration; position creation, pricing, and approval; position planning, funding, and budgeting; and cost allocations. The recruitment process group deals with recruiting new employees and includes processes addressing with position advertising, applicant management, candidate selection, and hiring. In the same way, the process group of personnel administration deals includes processes related to personnel actions, records management, salary administration, pension management, and general employee health & welfare. Continuing with Table 1, the time & attendance process group deals with tracking employee time and attendance, and it generally includes time recording & evaluation, absence, leave & attendance, work schedule & shift planning, time availability management, and time recording interfaces. Another process group in the field of human resource management relates to the process of compensation & benefits Admin that deals with employee benefits and includes processes of benefits & allowance eligibility, benefit enrollment, deduction calculation, separation benefits & retirement, and incentive management. Likewise, the payroll process group deals with pay and payroll accounting, including processes related to payroll processing, pay scale/rate changes, payment issuances & recovery, and retroactive pay. Continuing with the process groups in human resource management, the personnel development process group deals with personnel development and career planning, and includes processes addressing development planning, requirements & tasks, qualifications & skills, career path planning, and succession planning. Furthermore, the training process group deals with employee training and development. Relevant processes to the training process include training & event management, employee registration, appraisal administration, performance management, and knowledge management.

Continuing with Table 1, another set of process groups relate to resource management. The functional processes in resource management are closely related to those in the above-described human resource management. In particular, public sector organizations usually have process group concerning the review and monitoring of the deployment of resources across the organization. With an almost mandatory requirement to stay within their budget envelopes, organizations spend considerable effort to ensure that operations are kept financially sound, that budgets adhered and that resources are properly deployed to approved programs. As provided in Table 1, the resource management function includes a program management process group that deals with resource allocation to programs, generally including the processes of program planning, program design, and program-to-mandate alignment. Continuing with the process groups in resource management, the program evaluation process group deals with evaluating programs to their mandate and typically includes the processes of mandate assessment, program costing, and variance analysis. Similarly, the resource utilization process group deals with resource utilization and productivity, and often includes the processes of resource deployment, activity costing, and resource utilization. Likewise, the performance measurement process group deals with program performance measurement, such as the processes of program effectiveness and variance analysis.

Returning to Table 1, another function of importance in a public sector entity is procurement management. Procurement is a major function within public sector organizations that spend large amounts on a diverse portfolio of good and services. Paramount to this function is the need to ensure that good processes are in place to control spending, to meet budget requirements and to ensure a fair and competitive procurement process. One relevant process group, procurement control, deals with general procurement and generally includes processes related to demand management; source selection management; purchase order processing; routing & approval related to workflow; goods & service receipt and quality assurance; invoice verification & approval; and procurement card processing. Another process group, tender management, deals with creating and managing tenders and Requests-For-Proposals (RFP), and this process group generally includes the processes of bid/RFP development; bidder list and catalog integration; bid/RFP advertisement; change management; bid/RFP responses; and evaluation of Bids and subsequent awards. Continuing with tender management function, the process group of contract management relates to general contract administration and includes the processes of contract admin, negotiation & release; contract pricing, terms & conditions; routing & approval; subcontracting; change order management; the monitoring, performance, and close-out of contracts; policies, standard clauses & forms drafting; and closeout activities. In another process group, inventory control, deals with acquiring, controlling and issuing inventory and covers processes related to stock quantity & value management; goods movements; physical inventory; materials planning; warehouse management; distribution planning & management; and allocation & deployment.

Public sector organizations manage a large number of assets and facilities. Effective program control on this function can deliver significant efficiencies to the organization. As provided above in Table 1, several of the process groups relate to the function of facilities & asset management. In particular, the process group of asset management addresses and includes processes related to fixed asset accounting, fixed asset inventory management, leasing, and seized & abandoned goods. Likewise, the facilities & equipment process group deals with managing and accounting for facilities and equipment and includes processes related to facility & equipment master data, preventative maintenance & overhaul, maintenance & integrated work orders, equipment history tracking, and warranty management. Similarly, the fleet management process group deals with the management of vehicle fleets and includes the processes of fleet master data, fleet maintenance & overhaul, fleet planning/scheduling/dispatching, and warranty management. Continuing with the facilities and asset function, the real estate process group relates to real estate and property management and includes processes dealing with portfolio management, retail locations, kiosks and terminals, accounting & investment planning, construction project management, building maintenance, space & room management, and rent management. Another process group, asset disposal, relates to the disposition of assets and includes the processes of asset identification, disposal management, valuation adjustment, and the disposal of third party assets.

Another functional concern facing public sector organizations is that they often maintain large amounts of both current operational data as well as historical and or public record information. As a result, the public sector organizations are often challenged by the pressures caused by rapid accessibility to the data, the cost of maintaining ever-increasing volumes of data and the need to deal complex access and security demands.

Thus, returning to Table 1, another set of processes evaluated in the present invention relate to the function of corporate data management. One of these process groups, records management relates to the managing corporate records and frequently includes the processes of record structure definition & hierarchy, access authorization, and form generation & administration. Similarly, the workflow process group deals with automating the flow of documents and approvals and may include processes related to event & status driven item processing, calendaring, proxies & substitutions, shared & personal notes, e-mail & image enabled. Still another process group deals with a data warehouse or knowledge library and the building of this data information warehouse. This data warehouse process group may involve processes in structured information archiving; business content & performance; external and user specific data; prepared & ad-hoc analysis; data modeling; extraction & mining; and business process performance.

Yet another concern facing public sector organizations is that they often have demanding Information Technology (IT) requirements. Within this context, public sector organizations develop long term strategies that meet operational needs while, at the same time, these organizations are challenged with organizational changes, by program priority shifts, and in their ability to acquire and staff IT resources. Significant security and data access restrictions also play a large part in the function of systems management.

Several of the process group relate to this function of systems management, as detailed above in Table 1. One of the systems management-related process groups deals with planning, developing, and managing an IT strategy. Among the processes that may be included in the IT strategy development and planning are strategy development, implementation framework, long-range planning, and actual policy development. Another related process group addresses IT resourcing programs and include processes geared to resource planning, resource acquisition, skills planning & assessment, resource deployment, and resource related project accounting. Similarly, another process group deals with operating IT systems and programs, and processes relates to the IT operations process group include systems operations, backup, support, data security, and data recovery. In the same way, the process group of access and IT security includes processes addressing electronic signature and public key infrastructure (PKI), as well as security standards.

Another primary function of public sector organization is e-government management. This set of functional processes relates to the presence of the public sector organization on the Internet. The Internet offers unique opportunities and increasing demands for the delivery of government services. Typically, new technology acquisitions need to integrate with and e-government initiatives to minimize duplication of processes and to optimize the effectiveness of the delivery.

As provided in Table 1, one process group related to e-government management is e-Access, which deals with providing public Internet access to information and services and generally includes processes related to access to information and constituent self-service. Another process group, e-Support, relates to dealing with public access to benefits and support programs and may include specific processes in the fields of child support, health, employment, and education. Continuing with e-government function, the process group of e-revenue deals with revenues, licenses and fees and may include processes in the fields of tax filing, tax collection, licensing and permits. Similarly, the process group of e-procurement deals with expanding the use of the Internet for procurement tasks, and this process group may include various processes related to access to government business, government e-procurement, government-to-government transactions, and government-to-business transactions. Another e-government process group relates to e-Employee and generally deals with providing public sector employees with self-service functionality an embodied in the processes of HR records, leave balances, and Time and attendance. Still another process group in the function of e-government relates to e-work, which deals with providing employees remote work access and, thus, may have related processes of remote function access and security.

Once the organization has mapped and documented its functions, process groups, and process (respectively, step 211-213), the organization may further decompose the processes into the major activities carried in each process, step 214. For example, the process of Budget Development could have activities such as Prepare Budget Guidelines, Prepare Budget, Approve Budget, etc. To accelerate the process of decomposition, the organization may employ a predefined set of activities for each of the processes. Because of the voluminous nature of a composite list, all of the possible activities associated with each process are not listed in this application, but it should be appreciated that various activities may by selected as needed to classify the actions of the organization.

By the end of the visioning stage 210, the organization will have documented its major functions, the processes that are being carried mapped to the groups and entities that are carrying out the processes. This sets the stage for the next set of tasks—evaluating the activities within each process to determine how a technology acquisition can deliver value to the public sector enterprise.

Returning to FIG. 2A, the next step in the technology benefits realization method 100 is to create value drivers, step 220. The purpose of creating value drivers in step 220 is to create a list of all the potential value drivers for each activity in each process. These are then related to the potential that could be delivered with a technology acquisition. Value drivers are changes within a process that could result in a benefit through streamlining the process, lowering its overall cost, or enhancing the efficiency and effectiveness of delivery. As depicted in FIG. 2B, the creating of value drivers in step 220 generally includes three steps: development value drivers in step 221, development transformation benefits in step 222, and development technology expenditure benefits in step 223.

In the development of value drivers in step 221, the value drivers represent a statement of benefit, some value will be derived in the benefit is delivered. Thus In the development of value drivers in step 221 comprises defining the values drivers for each activity, as defined in step 214. To carry the development of value drivers in step 221, the organization examines each process and documents those areas where benefits can be derived. For example, in the Budget Distribution process, there could be a value driver such as "Reduce Time To Release". By obtaining an improvement in this driver, i.e.: actually reducing the time it takes to release the approved budget throughout the organization, a benefit will accrue. Thus value accrues to the organization when a benefit is achieved. In step 221, the organization actually documents where value can be potentially created in a process.

In addition, to ensure that strategic enterprise goals are being addressed, every value driver is preferably related to the enterprise's strategic business drivers. This directly links all opportunities for improvement in technology expenditure program to the goals and business drivers of the enterprise at the strategic level. Thus the technology expenditure business case and program is fully integrated to the strategic plan of the enterprise.

The next stage of the method 100 is to develop transformation benefits in step 222 that detail the changes or transformations that will result if the value driver is achieved. Using the example value driver in Budgeting of "Reduce Time To Release" of the approved budget, a transformation benefit, will be that expenditures within the organization will be subject to approved budget controls sooner than otherwise would be expected, thereby improving overall financial control within the organization.

Subsequently, the development of technology expenditure benefits in step 223 relates the transformation benefits to those that can be derived by implementing a technology expenditure, identifying the potential range of benefits from the technology expenditure. To do this, the organization carefully assesses each transformation benefit to the potential of it being realized through the technology expenditure. This is critically important as it helps to define the scope of the technology expenditure and the opportunity that it offers for change to the public sector organization. However, it is important to note that not every transformation benefit can be created from the technology expenditure. While a majority of the benefits can be, a number of the benefits may have to be derived from an alternative approaches.

The value drivers are the heart of defining the benefits realization potential for the technology expenditure. After the creation of the value drivers in step 220, the organization has documented the sources of potential benefit that the technology expenditure could deliver in the context of the processes being carried out by that particular public sector enterprise.

Continuing with FIG. 2A, the next task in the visioning phase 200 is to evaluate benefits potential in step 230. The evaluation of the benefits potential in step 230 establishes the potential and expected savings that can be attributed to the technology expenditure. To do this, the organization measures the cost of performing specific activities and relating theses to potential savings from the technology expenditure. The evaluation of the benefits potential in step 230 generally includes the four tasks of benchmarking total cost in step 231; developing achievement target in step 232; assessing probability range in step 233, and determining expected benefit in step 234.

In the benchmarking of total costs in step 231, the total enterprise cost for a process is assessed so that the organization may measure the enterprise cost for an activity. For some processes, the benchmarking of total costs in step 231 is not be too difficult. However, the benchmarking of total costs for others processes may be challenging, and organization may use cost estimates. In the benchmarking of total costs of step 230, the organization documents the assumptions behind the total cost estimate and what components are included or excluded.

After the enterprise cost is estimated, the organization performs the next task of developing an achievement target in step 232. In step 232, the organization sets a target of savings in an activity's cost. The setting of a savings target generally includes developing sources and the estimates for the savings. The assumptions may also be documented and adjusted as factors are fully developed.

The next task in the evaluation of benefits potential in step 230 is to assess probability range in step 233. During the assessment of a probability range in step 233, the organization sets a probability range for achieving the target. The organization may use a range of profiles so that a range of benefits can be assessed. The assessment of a probability range assists the benefits delivery planning process by helping to make the plans more realistic and achievable.

Figure 2D:
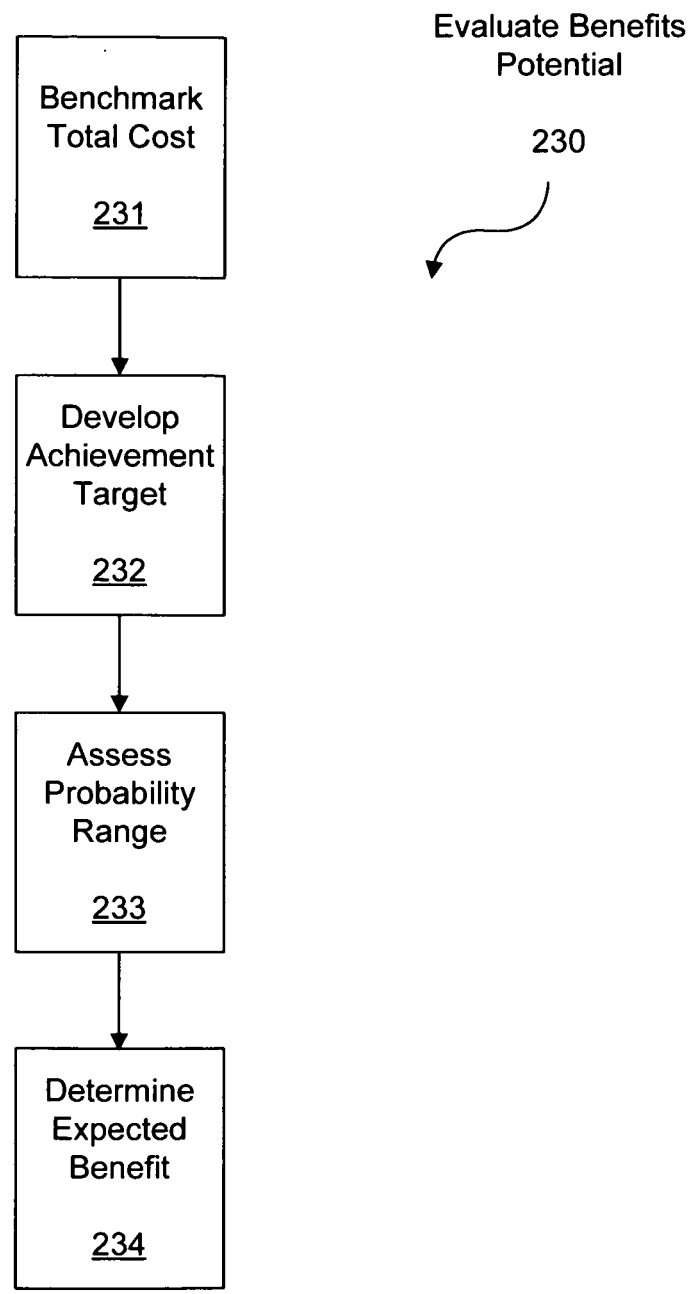

Continuing with the evaluation of benefits potential in step 230 as depicted in FIG. 2D, the organization determines expected benefit in step 234 by calculating a range of potential benefit by activity. The expected ranges of benefits are then calculated for each expected technology expenditure benefit. Then, organization calculates the total benefit expected.

After the completion of the evaluation of benefits potential in step 230, the organization has defined the range of savings possible through changes in processes and activities, which should be achievable with the technology expenditure. This range of savings sets the stage for the technology expenditure by defining the goals and the potential for savings to be delivered. The next stage is to select the specific technology expenditure in step 101 and then to fine-tune and integrate the benefits realization program to the selected system. In the next phase of this work, the benefits delivery plans are completed so that an overall benefits realization program built for the organization. The process continues to ensure that a viable and workable program is implemented to deliver results to the organization.

Returning to FIG. 1, the technology expenditure benefits realization method 100 continues with the integration phase 300. The objective of the integration phase 300 is to integrate the benefits realization program into the technology expenditure design and development program. In this way, the technology expenditure integrates with the business case framework. In doing so, the technology expenditure realization method 100 helps to ensure that the benefits transformation program can be undertaken and effectively structured in the organization when the new systems and business processes are implemented. The integration phase 300 is started after the technology expenditure has been selected to allow a fine-tuning of the visioning phase in step 200 to work to the chosen technology expenditure.

Figure 3A:
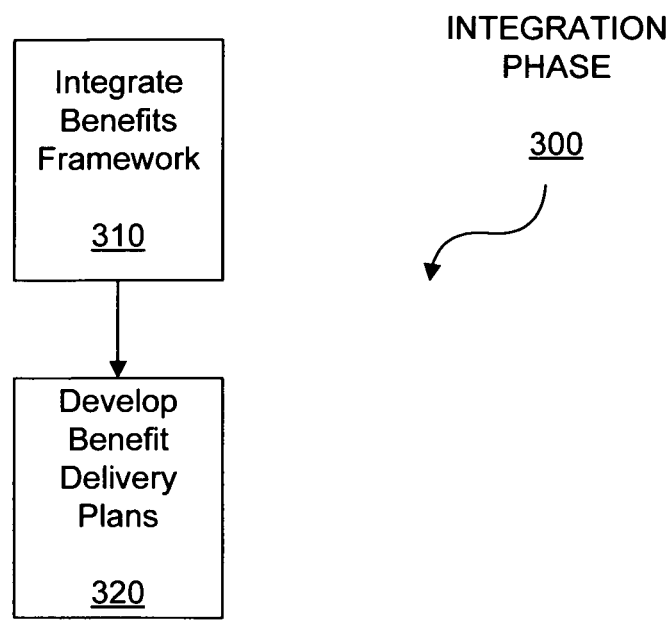
Figure 3B:
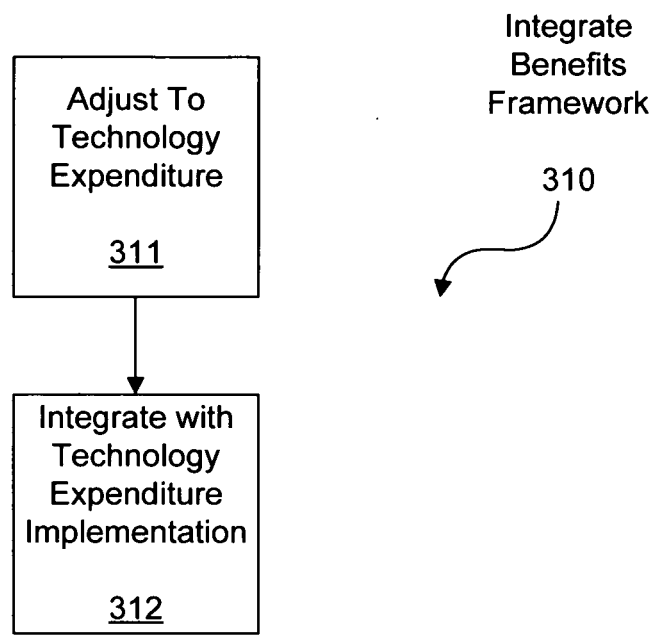

As depicted in FIG. 3A, the integration phase 300 generally includes two primary tasks, the integration of benefits framework in step 310 and the development of benefits delivery plans in step 320. The integration of benefits framework in step 310 seeks to ensure that the source of the technology expenditure benefits identified in the visioning phase 200 will be possible and achieved with the selected technology expenditure from step 101 and the scope of the implementation being planned. As illustrated in FIG. 3B, the integration of benefits framework in step 310 generally includes two steps, (1) the adjusting to the technology expenditure in step 311 to adjust the planned framework to selected technology expenditure; and (2) integration with technology expenditure implementation in step 312 to integrate the framework to the design of the technology expenditure.

In the adjustment to technology expenditure in step 311, the organization adjusts the previously identified technology expenditure benefits from step 200 to the technology expenditure selected in step 101. Since technology expenditure may cover different functionality and processes, the organization may eliminate those areas not specifically covered in the technology expenditure and hence the technology expenditure program. For example, if improved processes are anticipated in asset accounting, these benefits may be removed from the technology expenditure benefits realization program if the selected technology expenditure from step 101 does not offer this functionality.

Continuing with FIG. 3B, the organization next integrates the benefits from the visioning phase 200 with technology expenditure implementation, step 312. The integration with technology expenditure implementation in step 312 involves tuning the technology expenditure benefits realization program to the initial design or blueprint that is expected as part of the technology expenditure implementation. In many cases, the technology expenditure design being planned does not just focus on the expected benefits and addresses certain functionality needed by the enterprise. As a result, some of the expected benefits may not be realized initially since the technology expenditure scope may not involve implementing certain expected functionality in the first implementation. As a result, those expected benefits would not occur until a later stage. These benefits should be removed from the technology expenditure benefits realization program and deferred for following implementations. In conclusion, the technology expenditure benefits realization program then is tuned to the specific technology expenditure selected in step 101 and the program being planned.

Thus, the technology expenditure benefits realization methodology 100 integrates the planned benefits realization program with the actual technology expenditure implementation project. The technology expenditure benefits realization methodology 100 does so by aligning the technology expenditure Benefits planned for process tasks with the business processes being developed and designed in the technology expenditure program. In doing so, the technology expenditure benefits realization methodology 100 provides assistance to the technology expenditure program by helping it to ensure that those areas that offer high potential benefits are being addressed as part of the implementation. As the technology expenditure design progresses, the benefits program is tuned, updated and aligned to the technology expenditure program. Through this approach, the organization can ensure that the benefits expected for the technology expenditure program, and on which it will have been partially based, are aligned and synchronized with the program as it evolves. This integration of the business case to the technology expenditure program and the subsequent benefits realization program is a unique feature of the technology expenditure benefits realization methodology 100.

At this point, the areas of potential benefits have now been identified in the vision phase 100, the technology expenditure has been selected in step 101, and the benefits potential has been tuned to the selected technology expenditure in step 310. Referring again to FIG. 3A, the next step in the integration phase 300 is to develop benefits delivery plans, step 320. In developing a benefits delivery plans in step 320, the organization develops an implementation framework with detailed plans so that the benefits can be realized.

Figure 3C:
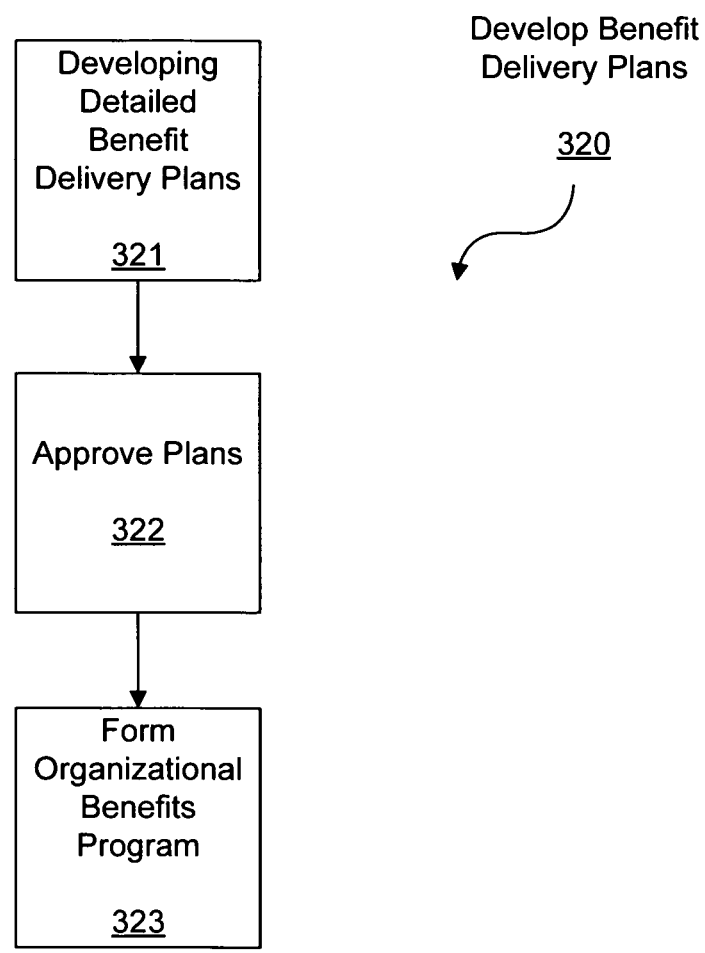

The steps 321-323 in developing benefits delivery plans in step 320 are depicted in FIG. 3. The first step is to develop detailed benefits delivery plans in step 321. Next, the organization approves and formalizes the plans in step 322 and forms an organizational benefits program that consolidates the plans in step 323.

The benefits delivery plans (BDP) developed in step 321 include each of the individual technology expenditure benefit opportunities identified in the visioning phase 200. The BDP thus generally include business change details, expected level of changes, stakeholder analysis, measurement criteria, timing, responsibility, assumptions, etc.

Once each individual BDP has been completed, each plan needs to be reviewed and approved by the organization in step 322. Preferably, approval is by both an individual responsible for managing each plan and delivering the results, as well as by an overall manager for the entire benefits realization program. The formalization and approval of each plan following the review and approval of the BDPs in step 322 generally is an important part of developing acceptance, participation, and support to the program.

All the individual plans are then integrated into a consolidated plan, an Organizational Benefits Realization Program (OBRP), in step 323. In forming OBRP in step 323, the organization preferably resolves overlaps or duplicates. Furthermore, the OBRP formed in step 323 is preferably integrated enterprise-wide so that the complete framework for implementing and delivering the technology expenditure benefits. Formation of the OBRP formed generally includes the reviewing of each plan, meeting the steps in the technology, addressing any overlaps, ensuring that the identified technology expenditure benefits have been covered, and then integrating the plans together. The OBRP may then be adjusted for a subsequent startup of the technology expenditure, allowing for any conversion processes, any new learning, and any efforts taken to stabilize the organization's system before productivity gains are accrued.

Following the visioning and implementation phases 200 and 300, the organization has created in individual benefits delivery plans and an integrated enterprise-wide organizational benefits realization program. As depicted in FIG. 1, the organization next implements the technology expenditure in step 102 and, then, formalizes and integrate the benefits realization program across the enterprise in the realization phase 400.

The realization phase 400 is designed to ensure that the benefits delivery plans are implemented and progress is monitored. To do this, the organization develops and implements a program to ensure that a benefits transformation program can be undertaken and then continuously monitored. Accordingly, realization phase 400 generally begins after selection of the technology expenditure in step 101 to allow for a fine-tuning of the visioning phase 200.

Figure 4A:
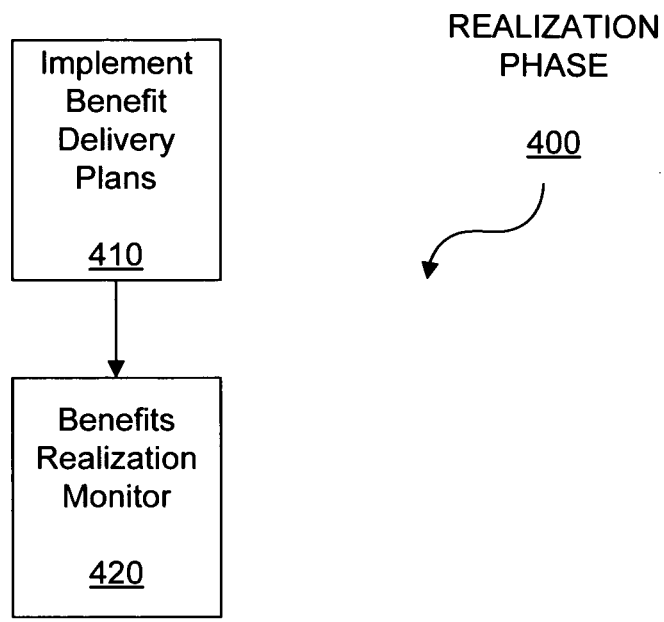

As illustrated in FIG. 4A, the realization phase 400 includes the steps of implementing benefits plans in step 410 and monitoring of benefits realization in step 420. With the completion and approval of the plans, the benefits plans are implemented in step 410 throughout the organization. Depending on the size and complexity of the organization, there may be a lot of effort required to implement the complete set of benefits delivery plans in step 410. Often, the organization assists managers in working with the plans.

Figure 4B:
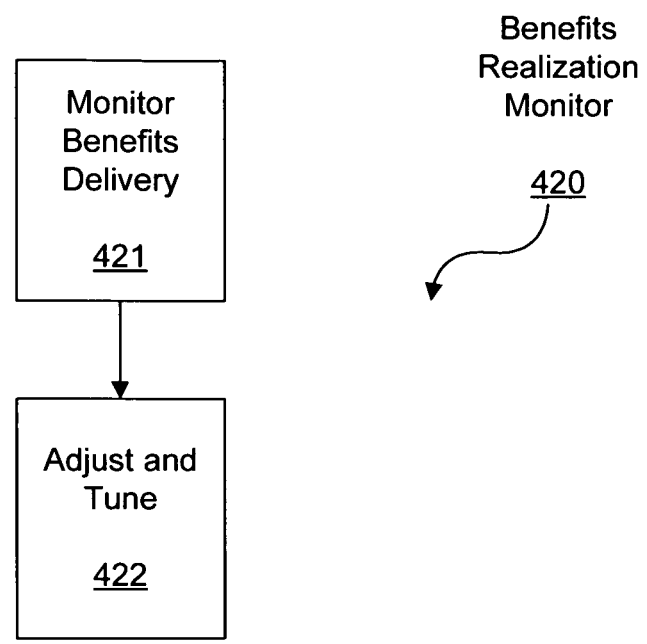

Subsequently, the organization implements mechanisms to measure, monitor, track, and review accomplishments to monitor benefits realization in step 420. With the detailed plans approved and in place after the visioning and integration phases in steps 200 and 300 and following the implementation of the technology expenditure in step 102, the organization measures and monitors the progress being made on the plans to assure achievement of the desired benefits. As illustrated in FIG. 4B, the monitoring of the benefits realization in step 420 may include the tasks of benefits delivery monitoring in step 421 and the adjusting and tuning of the technology expenditure in step 422.

The Benefits Delivery Monitor (BDM) in step 421 is a formal approach designed to monitor the progress of the individual BDPs and the overall success of the OBRP. The BDM generally comprise of a set of tools and templates designed to track each BDP, to assess each BDP, and to monitor progress to achieving expected goals. The results are then consolidated to a review of the progress of the OBRP and the benefits accruing to the organization.

Continuing with FIG. 4B, a particular implementation of the technology expenditure may be adjusted and tuned in step 422 as needed to achieve the desired benefits. The adjustment and the tuning of the technology expenditure in step 422 typically include processes to allow the implementation to be adjusted and tuned as the business planning cycle adjusts the organization's plans and priorities. As the scope of the technology expenditure is changed through new and adjusted functionality, then the Benefits realization Program should be adjusted and tuned to address the changes. Adjustments are made to address changes in the cost to program, differences in the implemented scope or functionality, differenced in how the system and individual processes are used, rate of user acceptance, changes in assumptions, etc. In this way the technology expenditure becomes a "living" process constantly delivering value to the public sector enterprise.

In summary, the realization phase 400 delivers a unique framework for benefits realization in the public sector, by providing a framework for planned and lasting change and for realizing benefits from a technology expenditure. Not only does the realization phase 400 complete a detailed business case, but it also implements a program to ensure that the benefits are delivered over time to the organization. In addition, it allows the technology benefits realization process to be tuned and adjusted to the evolution in the enterprise and changes in technology expenditure.

Technology Benefits Realization System

Figure 5:
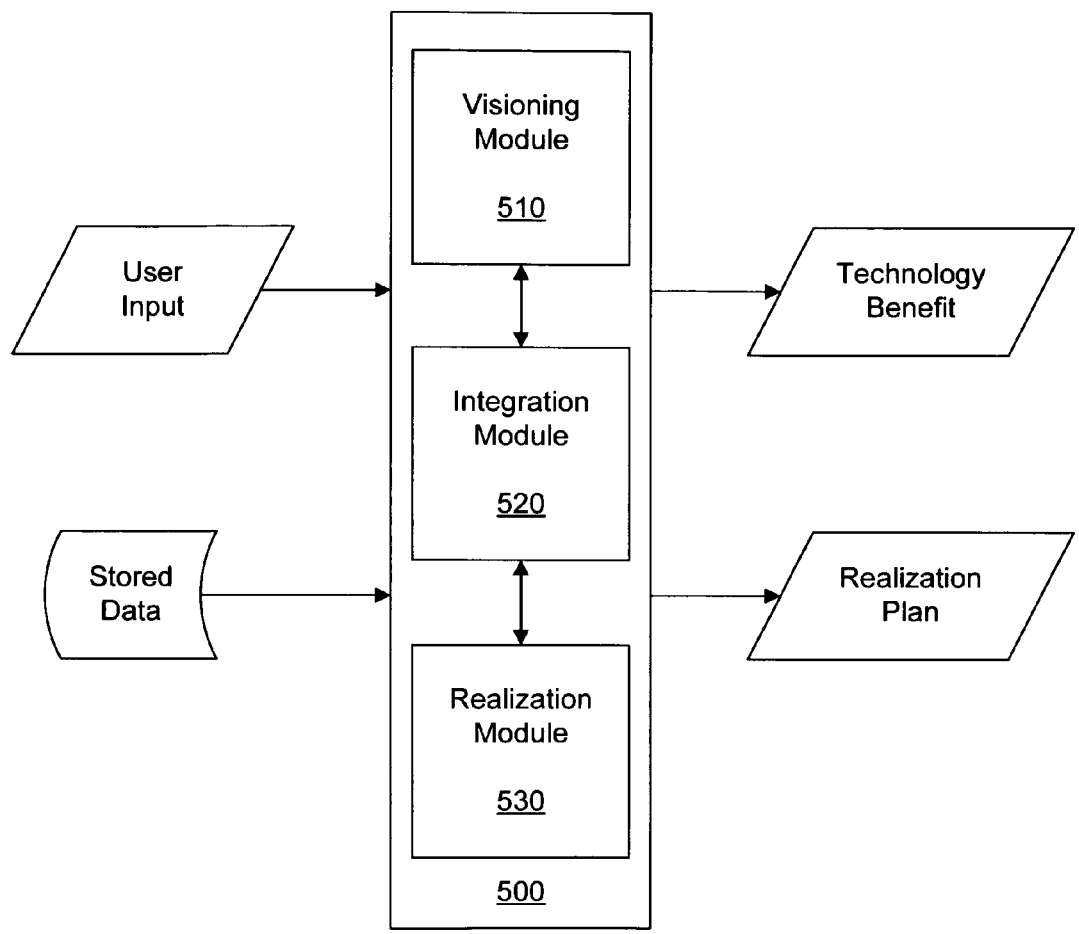
FIG. 5 depicts a system for measuring and realizing benefits to a public sector organization from technology expenditure in accordance with embodiments of the present invention.

In another embodiment, the present invention provides a technology benefits realization system 500. The technology benefits realization system 500 generally automates the steps of the technology benefits realization method 100, namely the visioning, integration, and realization phases 200, 300, and 400. In one embodiment, the technology benefits realization system 500 is a software tool that is used to help a public sector enterprise manage the technology expenditure benefits realization framework. As depicted in FIG. 5, the technology benefits realization system 500 may include a visioning module 510, an integration module 520, and an optional realization module 530. These modules 510-530 may be software programs or hardware components configured to implement the steps of method 100, as presently known.

The technology benefits realization system 500 generally includes a multi-user database. Furthermore, the technology benefits realization system 500 may be pre-configured with numerous processes specific to public sector organizations, thereby offering major efficiencies and cost savings for building the business case. The technology benefits realization system 500 may further be customizable and deployable for any public sector project. These and other aspects of the technology benefits realization system 500 are described in greater detail below.

Overall, the technology benefits realization system 500 helps to document the rationale and business case for the technology expenditure. The technology benefits realization system 500 further integrates with the technology expenditure program to transform the goals of the business case to benefits delivery plans. Once the technology expenditure program is implemented, the technology benefits realization system 500 continues to provide the planning and control mechanism for sustaining and monitoring change throughout the enterprise.

Figure 6A:
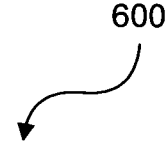
Figure 6B:
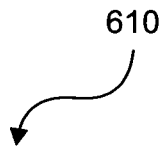
Figure 6E:
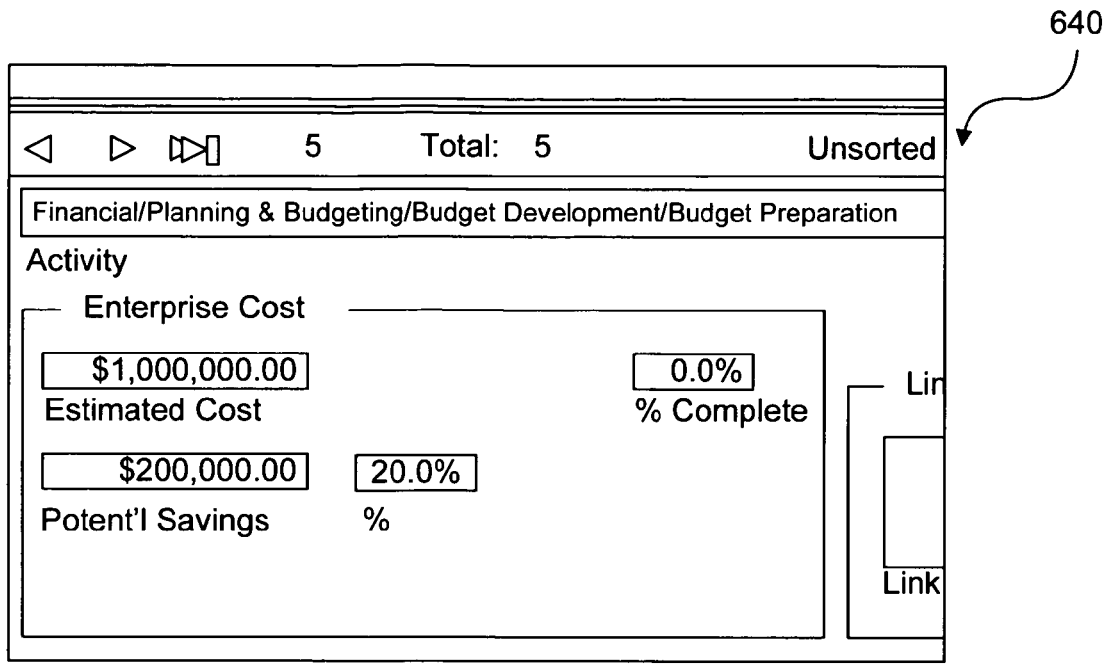
Figure 6F:
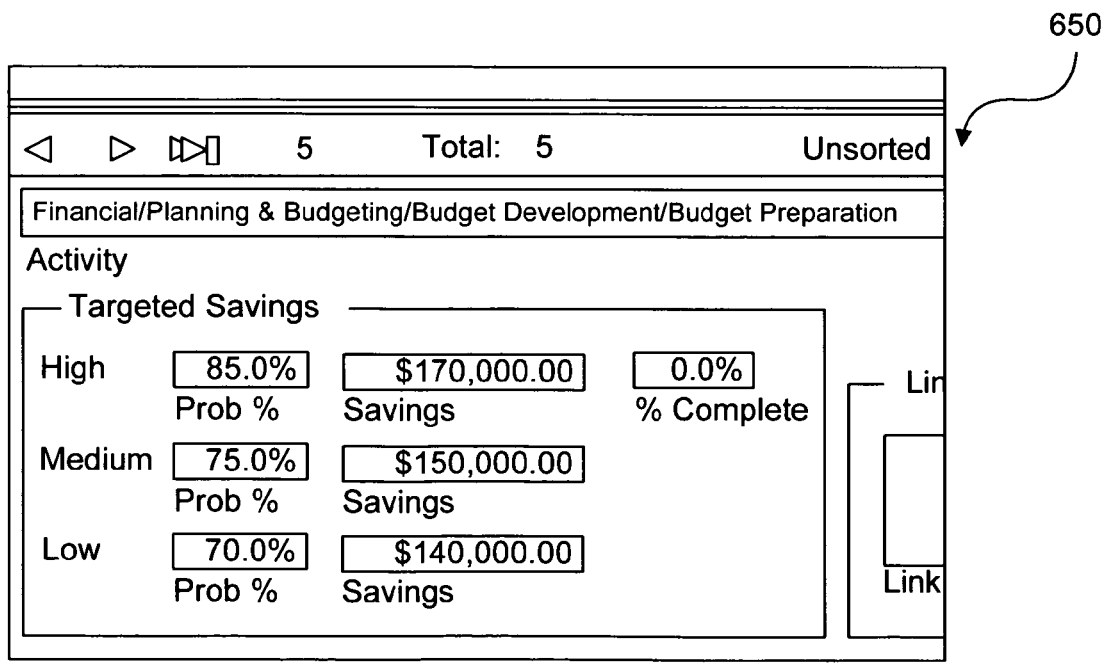

As described above, the technology benefits realization system 500 may be pre-configured with hundreds of processes related to the public sector organizations. In this way, the technology benefits realization system 500 offers significant productivity and a related lowering of cost in building a business case framework. As depicted in the display 600 of FIG. 6A, the technology benefits realization system 500 may support the key functions for public sector enterprises. Similarly, the technology benefits realization system 500 may present to a user one or more process groups for each function, as depicted in display 610 in FIG. 6B. The user may then select from the displayed functions when defining the value drivers for the organizations. In the same way, the technology benefits realization system 500 may present to the user one or more processes for each process group, as depicted in display 620 in FIG. 6C, and one or more activities for each process, as depicted in display 630 in FIG. 6D. For each activity, the expected enterprise cost and the targeted savings for activity can be documented, as generally depicted in display 640 and 650 in FIGS. 6E-6F, respectively.

Figure 6G:
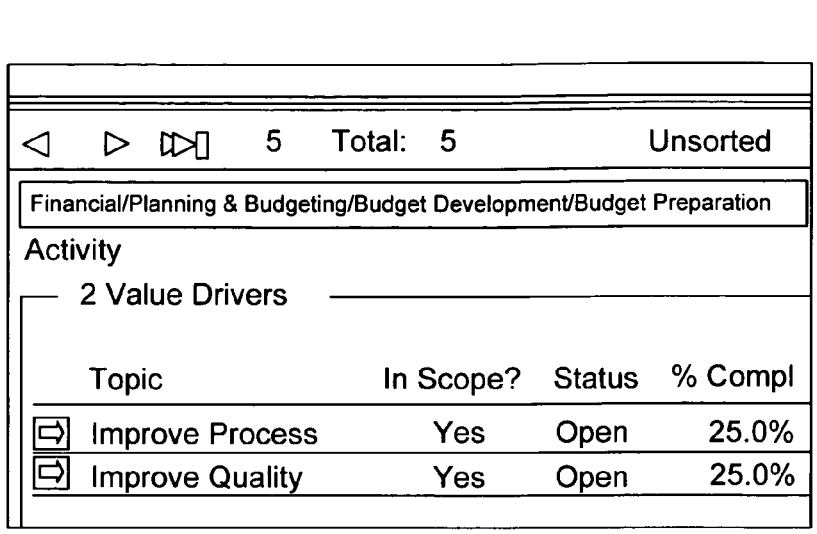
Figure 6H:
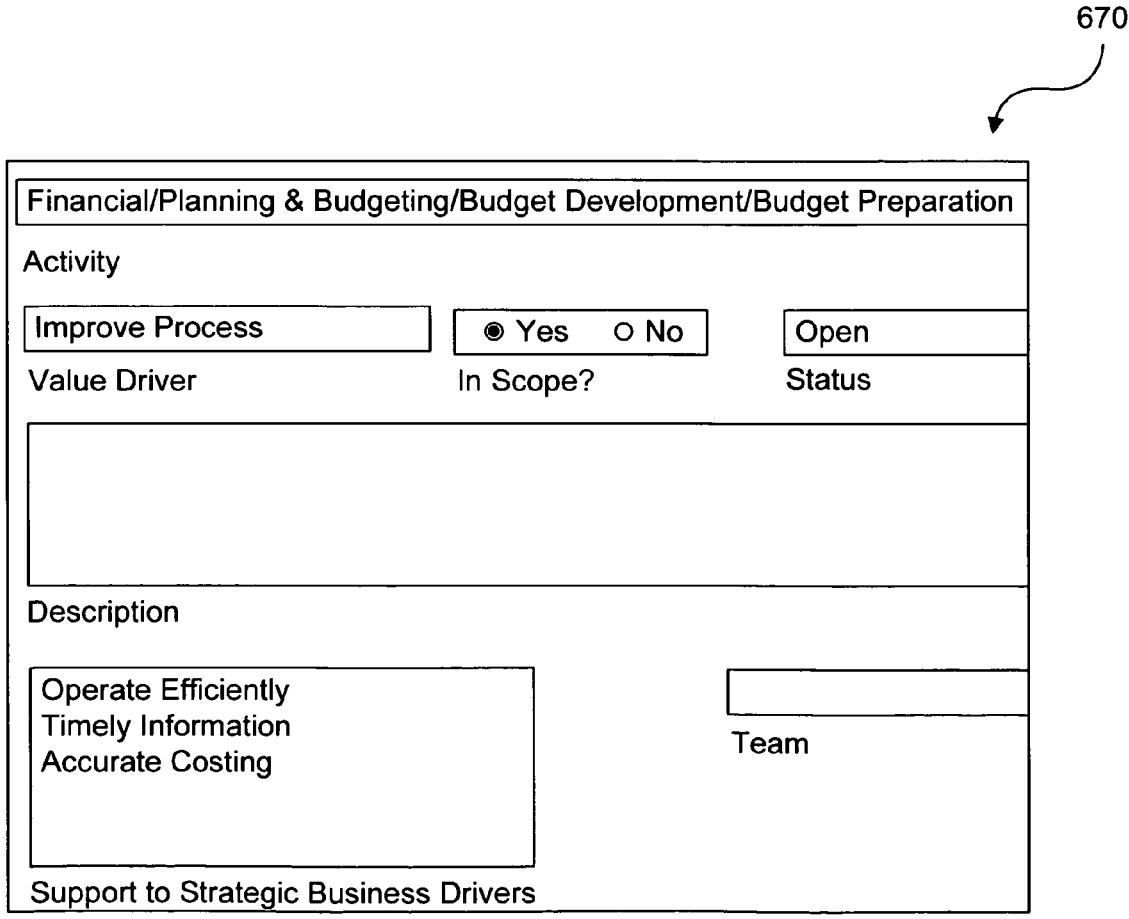
Figure 6I:
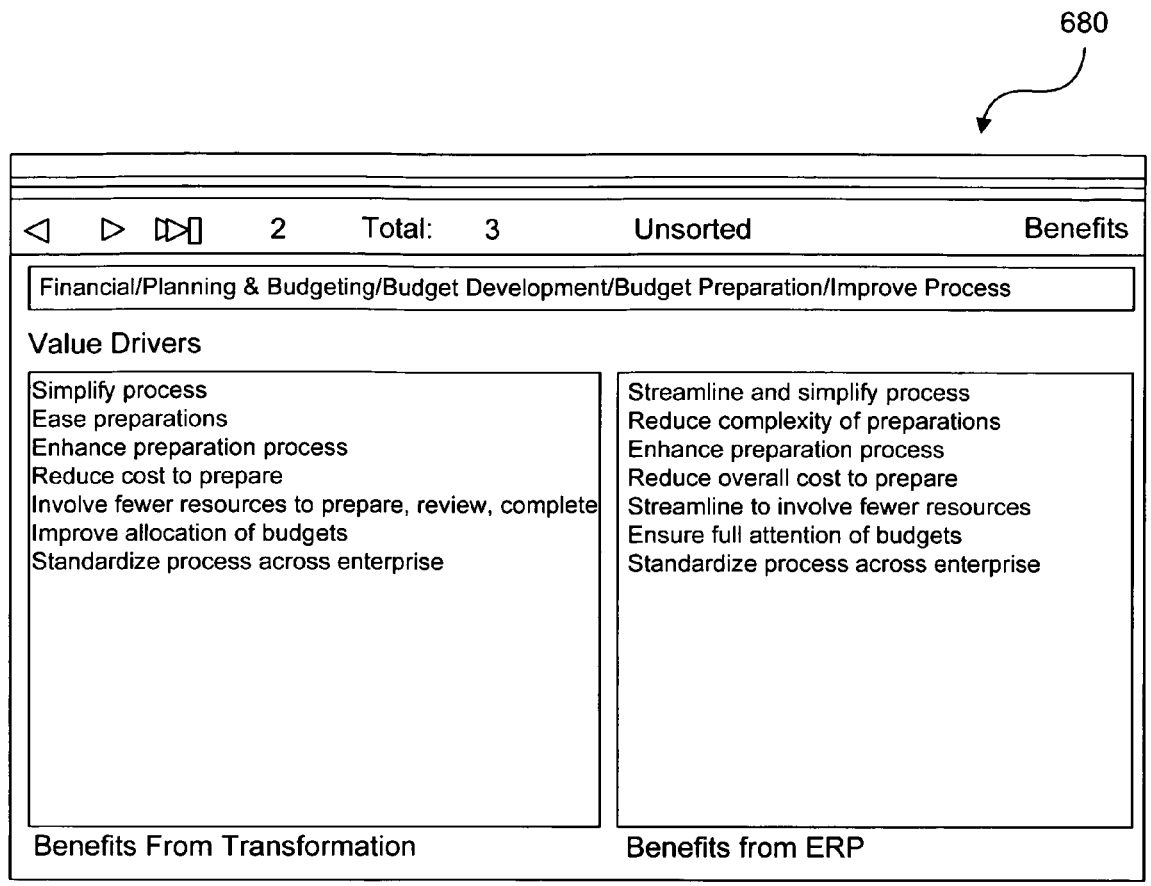
Figure 6J:
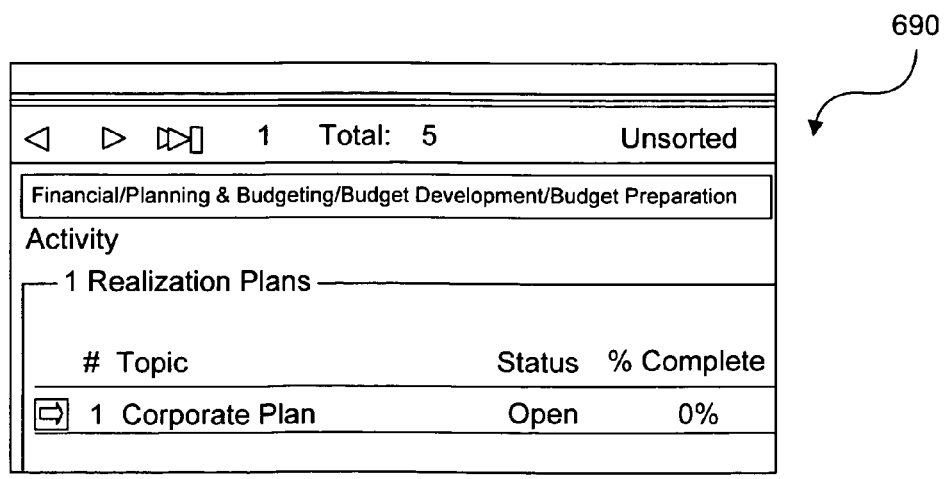

Subsequently, user may associate value drivers with each activity, as illustrated in display 660 of FIG. 6G. The value drivers can then be linked to the Strategic Business Drivers from the enterprise's Strategic Plan, as illustrated in display 670 of FIG. 6H. Within each Value Driver, the potential Transformation and technology expenditure benefits can be developed, as illustrated in display 680 of FIG. 6I. Then, each activity benefits realization plans can be built to integrate the benefits program to the technology expenditure and then to monitor enterprise performance against each plan as illustrated in display 690 of FIG. 6J.

Thus, the technology benefits realization system 500 is a comprehensive tool designed to significantly assist public sector organizations in their quest to successfully implement a technology expenditure. The technology benefits realization system 500 provides a discipline and structure to developing the business case. By automating the process and by providing defined activities to define value drivers, the technology benefits realization system 500 can dramatically lower the cost and complexity of completing the business case as it comes pre-loaded with numerous processes and activities specifically related to public sector organizations.

Furthermore, the technology benefits realization system 500 integrates the business case framework with the technology expenditure and provides the framework for developing and implementing plans and then monitoring the success of achieving planned results, as described above.

Conclusion

The foregoing description of the preferred embodiments of the present invention has been presented for the purposes of illustration and description. It is not intended to be exhaustive or to limit the invention to the precise form disclosed. Many modifications and variations are possible in light of the above teaching. For instance, the method of the present invention may be modified as needed to incorporate new communication technology, networks, and protocols as they are develop. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A computer-implemented public sector benefits realization method for use by a public sector organization, comprising the steps of:

generating, by a computer, a public sector benefits realization program for selecting and implementing a particular technology;

mapping the organization, by the computer, using the public sector benefits realization program, the mapping comprising:

mapping functions of the organization into one or more process groups;

determining one or more processes associated with the process groups; and determining, by the computer, one or more activities associated with the one or more processes, wherein the public sector benefits realization program is pre-configured with a plurality of processes related to public sector organizations and wherein the public sector benefits realization program presents one or more process groups for each function, one or more process groups for each process, and one or more activities for each process;

developing a set of value drivers, using the public sector benefits realization program, by using the mapping to evaluate the potential benefits of the particular technology, the developing comprising:

determining value drivers for one or more activities; and relating value drivers to a strategic plan of the public sector organization, the value drivers being linked to the one or more activities associated with the one or more processes;

developing, by the computer, using the public sector benefits realization program, a set of predicted transformation benefits related to the achievement of one or more value drivers;

identifying, using the public sector benefits realization program, a potential range of technology benefits by assessing one or more transformation benefits and an associated potential to be realized through the implementation of the particular technology;

evaluating, using the public sector benefits realization program, a benefits potential of an implementation of the particular technology, the evaluating comprising:

benchmarking a cost of one or more particular technology expenditures;

determining a plurality of expected savings that may be realized by implementing the particular technology;

assessing a probability range for realizing each expected savings of the plurality of savings; and calculating one or more expected ranges of benefits for the one or more expected technology expenditure benefits; and developing, by the computer, using the public sector benefits realization program, an implementation plan for delivering the particular technology to the organization, the implementation plan comprising:

a scheme for implementing the particular technology, wherein the scheme is updated as the one or more benefits are realized, deferred for following implementations, or removed; and a monitoring routine that monitors the realization of each of the one or more benefits and reports realized benefits of the particular technology implementation.

2. The method of claim 1, further comprising the step of using the value drivers to select the particular technology from a list of technologies.

3. The method of claim 1, further comprising the steps of: providing a list of functions for the mapping; considering a first task of the organization; and determining which function from the list of functions most closely resembles the first task.

4. The method of claim 3, further comprising the steps of: considering a second task of the organization, and
determining which function from the list of functions most closely resembles the second task.

5. The method of claim 3, further comprising the steps of: providing a list of processes for the mapping, and
determining which process from the list of processes most closely resembles the first task.

6. The method of claim 5, further comprising the steps of: providing a list of activities for the mapping; and
determining which activity from the list of activities most closely resembles the first task.

7. The method of claim 1, further comprising the steps of:
a. adjusting the potential benefits of the public sector benefits realization program to account for possible benefits that may not be realized by a benefits framework; and
b. adjusting the public sector benefits realization program to account for future benefits that will not be realized when the technology is initially integrated.

8. The method of claim 1, wherein the implementation plan comprises business change details, expected levels of changes, stakeholder analysis, measurement criteria, timing, responsibility, and assumptions.

9. The method of claim 1, wherein the step of developing the implementation plan comprises approving and formalizing the implementation plan.

10. The method of claim 1, wherein the step of developing an implementation plan comprises consolidating two or more benefits delivery plans to form an organization benefits realization program.

11. The method of claim 1, further comprising the steps of:
a. implementing the benefits delivery plan;
b. providing tools and templates for tracking realization of the expected benefits;
c. adjusting and tuning the technology to maximize realized benefits of the technology;
d. monitoring the benefit delivery plan for changes in functionality of the technology; and
e. adjusting and tuning the public sector benefits realization program to address changes in the functionality of the technology.

12. The method of claim 3, wherein the list of functions comprises the following functions: strategic management, financial management, revenue management, human resource management, resource management, procurement management, facilities & asset management, corporate data management, systems management, and e-government management.

13. The method of claim 12, wherein the strategic management function comprises the following processes: organizational strategy, program formulation & planning, program management, and corporate intelligence.

14. The method of claim 12, wherein the financial management function comprises the following processes: organizational strategy, program formulation & planning, program management, and corporate intelligence.

15. The method of claim 12, wherein the revenue management function comprises the following processes: taxpayer records management, forms management, tax assessment, tax billing, non-tax revenue, revenue accounting, and payments & collections.

16. A computer-implemented public sector benefits realization method for use by a public sector organization comprising the steps of:

generating, by a computer, a public sector benefits realization program for selecting a particular technology;

integrating the public sector benefits program into a benefits framework for determining a mapping and a set of value drivers for the organization;

mapping the organization, by the computer, using the public sector benefits realization program, the mapping comprising:

mapping functions of the organization into one or more process groups;

determining one or more processes associated with the process groups; and determining, by the computer, one or more activities associated with the one or more processes, wherein the public sector benefits realization program is pre-configured with a plurality of processes related to public sector organizations and wherein the public sector benefits realization program presents one or more process groups for each function, one or more process groups for each process, and one or more activities for each process; and developing a set of value drivers, using the public sector benefits realization program, by using the mapping to evaluate the potential benefits of the particular technology, the developing comprising:

determining value drivers for one or more activities; and relating value drivers to a strategic plan of the public sector organization, the value drivers being linked to the one or more activities associated with the one or more processes;

developing, by the computer using the public sector benefits realization program, a set of predicted transformation benefits related to achievement of the one or more value drivers;

evaluating, using the public sector benefits realization program, a benefits potential of an implementation of the particular technology, the evaluating comprising:

benchmarking a cost of one or more particular technology expenditures;

determining a plurality of expected savings that may be realized by implementing the particular technology;

assessing a probability range for realizing each expected savings of the plurality of savings; and calculating one or more expected ranges of benefits for the one or more expected technology expenditure benefits.

17. A computer-implemented public sector benefits realization method for use by a public sector organization comprising the steps of:

generating, by a computer, a public sector benefits realization program for selecting and implementing a particular technology;

mapping the organization, by the computer, using the public sector benefits realization program, the mapping comprising:

mapping functions of the organization into one or more process groups;

determining one or more processes associated with the process groups; and determining, by the computer, one or more activities associated with the one or more processes;

developing a set of value drivers, using the public sector benefits realization program, by using the mapping to evaluate the potential benefits of the particular technology, the developing comprising:

determining value drivers for one or more activities; and relating value drivers to a strategic plan of the public sector organization, the value drivers being linked to the one or more activities associated with the one or more processes; and evaluating, using the public sector benefits realization program, a benefits potential of an implementation of the particular technology, wherein the evaluating comprises:

benchmarking a cost of one or more particular technology expenditures;

determining a plurality of expected savings that may be realized by implementing the particular technology;

assessing a probability range for realizing each expected savings of the plurality of savings; and calculating one or more expected ranges of benefits for the one or more expected technology expenditure benefits; and developing, by the computer, using the public sector benefits realization program, an implementation plan for delivering the particular technology to the organization, the implementation plan comprising:

an scheme for implementing the particular technology, wherein the scheme is updated as the one or more benefits are realized, deferred for following implementations, or removed; and a monitoring routine that monitors the realization of each of the one or more benefits and reports realized benefits of the particular technology implementation.

* * * * *

UNITED STATES PATENT AND TRADEMARK OFFICE
CERTIFICATE OF CORRECTION

PATENT NO. : 8,655,710 B2  Page 1 of 1
APPLICATION NO. : 12/314683
DATED : February 18, 2014
INVENTOR(S) : Peter H. Clarkson It is certified that error appears in the above-identified patent and that said Letters Patent is hereby corrected as shown below:

In the Claims:

Col. 24, Line 20, Claim 17, "an scheme" should read as --a scheme--.

Signed and Sealed this
Sixth Day of May, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,655,710 B2 | Page 1 of 1 |
| APPLICATION NO. | : 12/314683 | |
| DATED | : February 18, 2014 | |
| INVENTOR(S) | : Peter H. Clarkson | |

It is certified that error appears in the above-identified patent and that said Letters Patent is hereby corrected as shown below:

On the title page

Item (73) Assignee: Accenture Global Services GmbH (CH)

should correctly read as follows:

(73) Assignee: Accenture Global Services Limited (IE)

Signed and Sealed this
Eighth Day of December, 2015

Michelle K. Lee
*Director of the United States Patent and Trademark Office*